United States Patent [19]
Olson et al.

[11] 3,760,844
[45] Sept. 25, 1973

[54] CIRCUIT MODULE FOR FLUID DISTRIBUTION
[75] Inventors: Paul E. Olson; Ronn J. Leaf, both of Lexington, Ky.
[73] Assignee: Westinghouse Air Brake Company, Wilmerding, Pa.
[22] Filed: July 19, 1971
[21] Appl. No.: 163,668

[52] U.S. Cl................ 137/608, 137/833, 29/157.1
[51] Int. Cl............................................... F17d 1/00
[58] Field of Search................... 137/608, 610, 81.5

[56] References Cited
UNITED STATES PATENTS

| | | | |
|---|---|---|---|
| 3,572,368 | 3/1971 | Bullmer | 137/608 X |
| 3,407,846 | 10/1968 | Brandenberg | 137/608 |
| 3,646,963 | 3/1972 | Klee | 137/608 |
| 3,547,139 | 12/1970 | Van Berkum | 137/608 X |
| 3,516,436 | 6/1970 | Klaus et al. | 137/608 X |
| 3,433,260 | 3/1969 | Higgins | 137/608 |
| 3,461,900 | 8/1969 | Dexter et al. | 137/608 X |
| 3,631,881 | 1/1972 | Bowditch | 137/608 X |

*Primary Examiner*—Samuel Scott
*Attorney*—Ralph W. McIntire, Jr.

[57] ABSTRACT

This invention relates to a circuit module for fluid distribution through which a source of fluid under pressure is connected to a plurality of logic control valve devices by means of passageways provided by interconnected cells or chambers formed in a moulded cellular plastic fluid circuit plate interposed between an upper and a lower flat cover plate, each provided with a plurality of passageways. Certain of these passageways in the upper cover plate open at one end into a corresponding cell or chamber in the circuit plate and at the opposite end registering with one end of a passageway in one of the logic valve devices, each of which is removably mounted on this cover plate. One or more passageways, each of any configuration, can be provided in the cellular plastic fluid circuit plate by removing a part of the plastic wall or partition between each adjoining pair of a plurality of pairs of the cells or chambers thereby providing for the flow of fluid from a source of fluid under pressure connected to a first one of the cells via a passageway in a manifold secured to the lower cover plate and a passageway in this plate, then successively through the other of the interconnected cells or chambers and the respective passageway in the upper cover plate to the logic valve device, or from the logic valve device through a passageway in the upper cover plate, another passageway provided by a second set of interconnected cells or chambers in the circuit plate to a second logic control valve device either mounted on the upper cover plate or located remote therefrom and connected to the manifold by suitable piping, or to atmosphere. The cover plates and the fluid circuit plate may be secured together either by a suitable bonding sealing material or a plurality of bolts and nuts and the logic valve devices may be removably secured to the upper cover plate by bolts that extend through these three members and receive a nut on their outer end. The cells or chambers in the moulded plastic fluid circuit plate may be hexagonal, triangular or any other desired shape, these chambers being separated one from the other by a thin plastic wall, a portion of which may be easily broken or cut out to provide a communication between any two adjacent chambers.

4 Claims, 10 Drawing Figures

CIRCUIT MODULE FOR FLUID DISTRIBUTION

BACKGROUND OF THE INVENTION

Heretofore, it has been common practice in fluid pressure operated systems to individually mount the logic valve devices at scattered locations, and to interconnect these valve devices and the source of fluid under pressure by individual sets of unenclosed piping or tubing. Such fluid pressure operated systems have a high incidence of vibration because of the constant pulsation of the fluid under pressure associated with the supply and release of this fluid from the logic valve devices. Such vibrations frequently effect loosening of the piping or tubing at various connection points to the logic valve devices and the source of pressure so as to cause leakage resulting in improper operation of these logic valve devices. The correction of such leakage often times requires considerable expenditure of time because of the decentralization of the piping or tubing connections.

Accordingly, it is the purpose of this invention to provide a novel circuit module for fluid distribution to which a source of fluid under pressure is connected and upon which is mounted a plurality of logic control valve devices. These valve devices are either supplied with fluid under pressure or connected to another logic control valve device by passageways in a moulded plastic fluid circuit plate that is clamped between an upper cover plate on which the logic valve devices are removably mounted and a lower cover plate to which is secured a pair of manifolds to which in turn a source of fluid under pressure is connected, there being passageways extending through both the lower cover plate and manifold and opening into the passageways in the circuit plate.

SUMMARY OF THE INVENTION

According to the present invention, a novel circuit module for fluid distribution to a plurality of logic valve devices is provided, which module comprises a plastic moulded fluid circuit plate interposed between an upper and a lower cover plate on which upper plate the plurality of logic control valve devices are removably mounted. A pair of input and output manifolds are secured to the lower cover plate at the opposite ends thereof. The moulded circuit plate comprises a plurality of polygonal chambers, each separated from the adjacent chambers by a thin plastic wall. One or more passageways may be provided in the circuit plate, each extending through two or more of the polygonal chambers. Each passageway is formed by breaking or cutting out a portion of the plastic wall separating each pair of adjacent chambers. Thus, by the proper selection of the walls from which a portion thereof is removed, the resulting passageway or plurality of passageways, each extending through successive adjacent polygonal chambers may be made to have any desired configuration to provide a communication through which fluid may flow from the source of fluid under pressure to one or more of the logic valve devices or from one logic valve device to another.

In the accompanying drawings:

FIG. 1 is a schematic view of a fluid pressure control system for operating a diesel engine.

FIG. 2 and FIG. 2A, when taken together such that the right-hand edge of FIG. 2 is matched with the left-hand edge of FIG. 2A, constitute a plan view of a circuit module for the fluid distribution to the diesel engine control system shown in FIG. 1 and is formed by the interposition of a moulded cellular plastic fluid circuit plate between upper and lower cover plates, upon the upper of which is removably mounted a plurality of logic valve devices, a portion of this upper cover plate being removed to show the cellular construction of the fluid circuit plate.

FIG. 3 is an end view, partly in section, of the circuit module and valve devices mounted thereon shown in FIGS. 2 and 2A.

FIG. 4 is an exploded view of part of the circuit module shown in FIGS. 2 and 2A, in which certain of the cells or chambers formed in both the upper and lower sides of the circuit plate, which is interposed between an upper and a lower cover plate, may be interconnected to form fluid pressure supply and delivery passageways leading via bores in the upper cover plate to and from the valve devices removably mounted on the upper cover plate.

Figure 1:
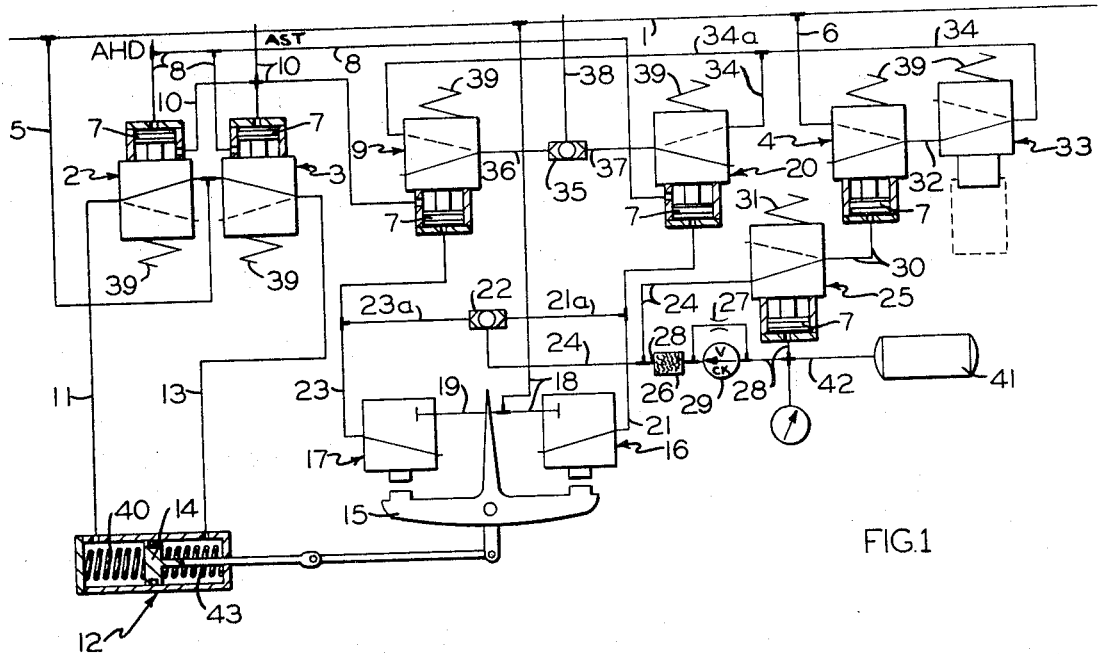

Referring to FIG. 1, there is shown a plurality of fluid pressure and solenoid-operated valve devices for controlling the operation of, for example, a diesel engine, the various valve devices being interconnected in a conventional manner by suitable piping through which fluid under pressure is supplied to and delivered from these valve devices. It should be understood that the same fluid pressure flow passageways constituted by the interconnected piping shown in FIG. 1 is provided by the hereinafter-described interconnected cells or chambers formed in the circuit plate of the circuit module constituting the first embodiment of the present invention.

As shown in FIG. 1, the fluid pressure control system for a diesel engine comprises a fluid pressure supply pipe 1 that may be connected to a fluid pressure storage reservoir (not shown) and to the supply port of three double-acting piston-operated on-off valve devices 2, 3 and 4 by branch pipes 5 and 6. Each of these on-off valve devices 2, 3 and 4 comprises an operating piston 7, the upper side of the piston 7 of the valve device 2 and the lower side of the piston 7 of the valve device 3 being supplied with fluid under pressure via an ahead control pipe 8 when a manually-operated control valve device (not shown) is operated by an operator to effect the supply of fluid under pressure to this ahead control pipe 8 to cause operation of the diesel engine in one or the ahead direction. Likewise, the lower side of the piston 7 of the valve device 2, the upper side of the piston 7 of the valve device 3 and the upper side of the piston 7 of an on-off valve device 9 is supplied with fluid under pressure via an astern or reverse control pipe 10 when the manually-operated control valve device is operated by the operator to cause operation of the engine in the opposite or astern direction.

Referring to FIG. 1 of the drawings, it will be noted that the delivery port of the valve device 2 is connected by a pipe 11 to the left-hand end of a three-position fluid motor 12, and that the delivery port of the valve device 3 is connected by a pipe 13 to the right-hand end of this fluid motor, the operating piston 14 of which is connected by a suitable linkage to a double bell-crank lever 15. The rocking of bell-crank lever 15 in a clockwise direction effects operation of an on-off valve device 17 and in a counterclockwise direction effects operation of an on-off valve device 16.

As shown in FIG. 1, fluid under pressure is supplied from the hereinbefore-mentioned supply pipe 1 to the valve device 16 via a pipe 18 and to the valve device 17 via a branch pipe 19 connected to the pipe 18 intermediate the ends thereof. Furthermore, as shown in FIG. 1, the delivery port of the valve device 16 is connected to the lower side of the piston 7 of an off-on valve device 20 by a pipe 21 that has a branch pipe 21a that is connected to the right-hand supply port of a double check valve device 22, and the delivery port of the valve device 17 is connected to the lower side of the piston 7 of the valve device 9 via a pipe 23 that has a branch pipe 23a connected to the left-hand supply port of the double check valve device 22. The outlet port of the double check valve device 22 is connected by a pipe 24 to a supply port of an on-off valve device 25 having an operating piston 7, the lower side of which is supplied with fluid under pressure at a controlled rate via a strainer 26 and a choke 27 disposed in series relation in a pipe 28 connected to the pipe 24 intermediate the ends thereof. In order to provide for a fast flow of fluid under pressure from the lower side of the piston 7 of the valve device 25, a one-way flow check valve 29 is connected in by-passing relation to the choke 27, it being understood that the strainer device 26, choke 27 and check valve 29 all may be incorporated in a single device that is provided with a flange having a pair of holes therein for receiving a pair of cap screws whereby this device may be secured to a cover plate of a circuit module constituting the present invention.

The delivery port of the valve device 25 is connected to the lower side of the piston 7 of the valve device 4 by a pipe 30 and in the absence of fluid under pressure in the pipe 28, a spring 31 is effective to bias the valve device 25 to its on position shown in which it establishes a communication between the pipes 24 and 30.

As shown in FIG. 1, the delivery port of valve device 4 is connected by a short pipe 32 to the supply port of a solenoid-operated on-off valve device 33, the delivery port of which is connected by a pipe 34 to the supply port of the hereinbefore-mentioned on-off valve device 20 and to the supply port of the hereinbefore-mentioned on-off valve device 9 by a branch pipe 34a. The delivery ports of the valve devices 9 and 20 are connected to the respective opposite ends of a double check valve device 35 by a pair of pipes 36 and 37. Connected to the outlet of this double check valve device 35 is one end of an engine starting pipe 38, it being understood that the supply of fluid under pressure to this pipe causes starting of the diesel engine by operating a suitable engine starting mechanism (not shown).

The on-off valve devices 2, 3, 4, 9, 20 and 33 are each provided with a return spring 39 for biasing these valve devices to the position shown in which a fluid pressure communication is established through the valve devices 2, 3 and 33 and cut off or disestablished through the valve devices 4, 9 and 20.

In the operation of the diesel engine control system shown in FIG. 1, the ahead control pipe 8 and the reverse or astern control pipe 10 are alternately supplied with fluid under pressure from a suitable source of fluid under pressure (not shown) in response to the movement of the handle of the hereinbefore-mentioned manually-operated control valve device from its stop position into either an ahead quadrant or an astern (reverse) quadrant. When fluid under pressure is thus supplied to the ahead control pipe 8, it flows to the upper side of the piston 7 of the valve devices 2 and 20 and to the lower side of the piston 7 of the valve device 3. This supply of fluid under pressure to the upper side of the piston 7 of the valve device 2 moves this piston 7 downward against the yielding resistance of corresponding spring 39 to its lower position thereby operating this valve device 2 to its off position whereupon the supply of fluid under pressure to the left-hand side of the piston 14 is cut off and fluid under pressure from this side of this piston is vented to atmosphere via pipe 11 and the valve device 2 which is now in its off position.

As fluid under pressure is thus vented from the left-hand side of the piston 14 in the manner just explained, the fluid under pressure supplied from supply pipe 1 to the right-hand side of this piston via branch pipe 5, valve device 3 in its on position and pipe 13 is effective to move this piston 14 from its center position in which it is shown in FIG. 1 in the direction of the left hand against the yielding resistance of a first centering spring 40. Since the piston 14 is operatively connected to the double bell-crank lever 15 by a suitable linkage, as aforestated, this movement of the piston 14 in the direction of the left hand is effective to rock the bell-crank lever 15 clockwise until it effects operation of the valve device 17 to its on position.

Upon operation of the valve device 17 to its on position, fluid under pressure will flow from the supply pipe 1 to the pipe 23 via pipes 18 and 19 and the valve device 17. Fluid under pressure thus supplied to the pipe 23 flows to the lower side of the piston 7 of the valve device 9 to operate it to its on position and to the branch pipe 23a.

Fluid under pressure supplied to branch pipe 23a flows to the left-hand end of the double check valve device 22 and thence through pipe 24, valve device 25 now in its on position, as shown in FIG. 1, and pipe 30 to the lower side of piston 7 of valve device 4. This supply of fluid under pressure to the lower side of piston 7 causes operation of valve device 4 from its off position to its on position whereupon fluid under pressure flows from the supply pipe 1 to the engine starting pipe 38 via branch pipe 6, valve device 4 now in its on position, pipe 32, solenoid-operated valve device 33 now in its on position, pipe 34, branch pipe 34a, valve device 9 now in its on position, pipe 36 and double check valve device 35. This supply of fluid under pressure to the engine starting pipe 38 causes operation of the engine starting mechanism to effect starting of the diesel engine.

Fluid under pressure supplied to the pipe 24 in the manner hereinbefore explained flows therefrom to the lower side of the piston 7 of the valve device 25 via pipe 28, strainer 26 and choke 27, and also to a volume reservoir 41 that is connected to the pipe 28 on the outlet side of the choke 27 by a pipe 42. Consequently, pressure will build up on the lower side of this piston 7 and in the volume reservoir 41 at a slow rate controlled by the size of the choke 27 which is of such size that sufficient pressure is not built up on the lower side of this piston 7 to operate the valve device 25 from its on position to its off position until after the fluid under pressure supplied to the engine starting pipe 38 in the manner hereinbefore described has effected starting of the engine in the ahead direction, it being understood that the engine cam shaft has been moved to the position to cause operation of the diesel engine in the ahead direction by a suitable mechanism operated in response to movement of the handle of the manually-operated control valve device from its stop position into its ahead quadrant.

Upon movement of the valve device 25 to its off position, fluid under pressure is vented from the lower side of the piston 7 of the valve device 4 via pipe 30 and the valve device 25 whereupon the corresponding spring 39 is rendered effective to move the valve device 4 to its off position thereby cutting off flow of fluid under pressure from the supply pipe 1 to the engine starting pipe 38.

It should be understood that, upon manual movement of the handle of the manually-operated control valve device from its stop position into its astern or reverse quadrant, the piston 14 will move in the direction of the right hand against the yielding resistance of a second centering spring 43 to effect counterclockwise rocking of the double bell-crank lever 15 to effect operation of the valve device 16 to its on position whereupon the proper valve devices will be supplied with fluid under pressure to cause the diesel engine to be started in the astern or reverse direction, it being understood that the engine cam shaft has been moved to the position to cause operation of the diesel engine in the astern or reverse direction in response to movement of the handle of the control valve device from its stop position into its astern quadrant.

Figure 2:
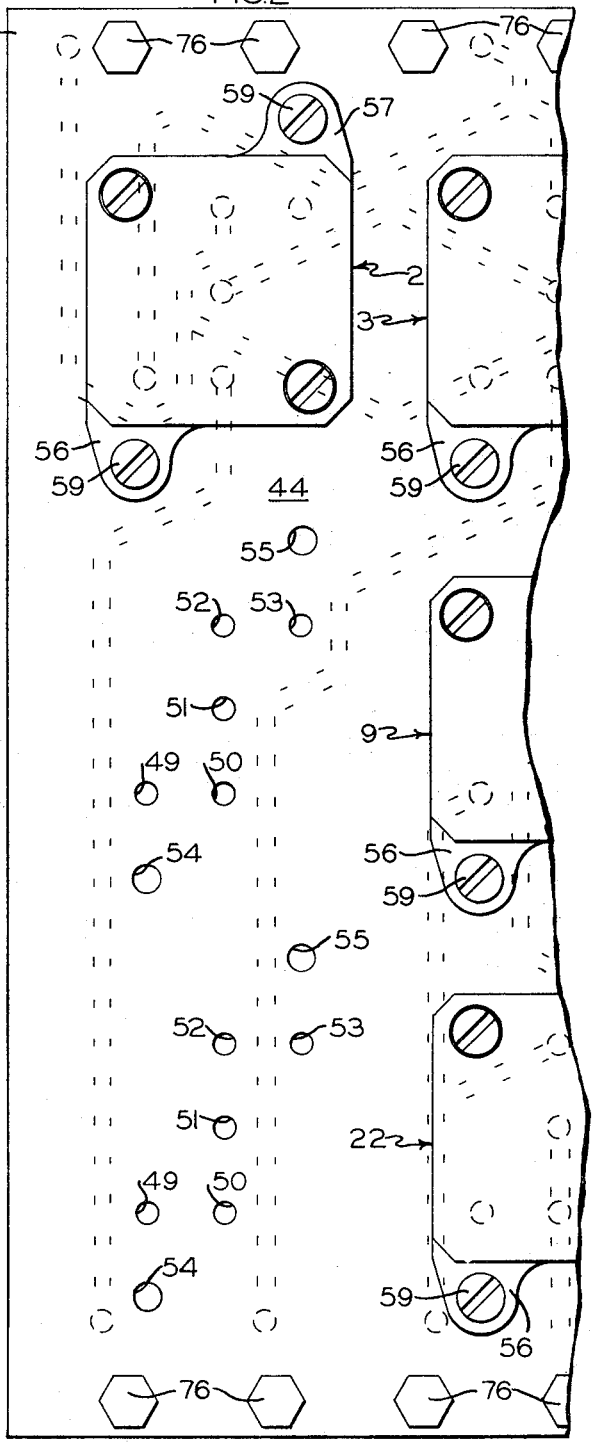
Figure 2A:
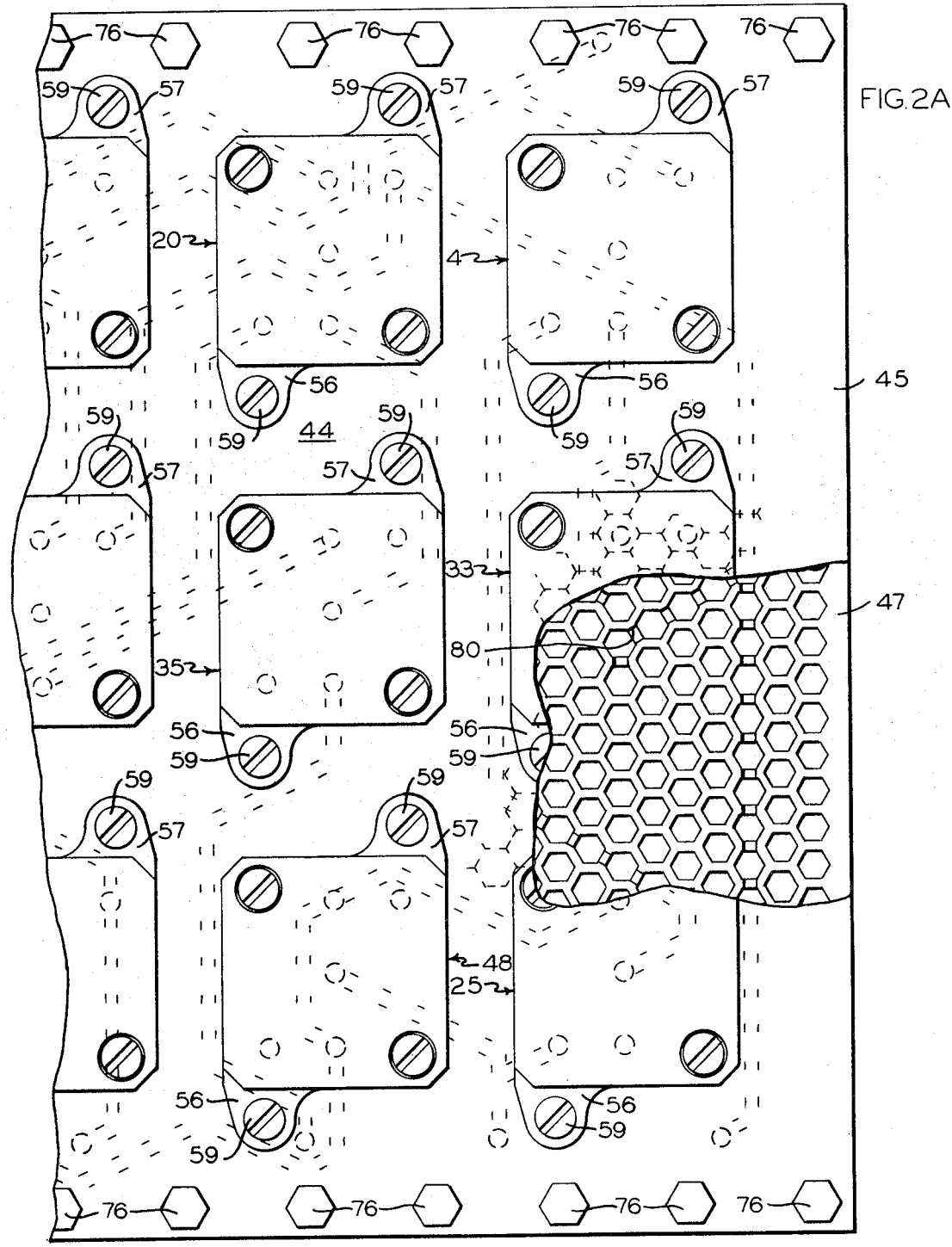

Referring now to FIGS. 2 and 2A, when taken together such that the right-hand edge of FIG. 2 is matched with the left-hand edge of FIG. 2A, there is shown a plan view of a circuit module 44 for fluid distribution. Such a circuit module comprises three members, and in order to give the module sufficient rigidity and to reduce module thickness, at least one of these members should be constructed of metal. Therefore, the module 44 comprises, for example, a plastic cover plate 45, upon which is removably mounted a plurality of the valve devices shown in FIG. 1 of the drawings, a lower cover plate 46 (FIGS. 3 and 4) which is constructed of metal and a moulded cellular plastic fluid circuit plate 47 interposed therebetween. There may be formed in the circuit plate 47 and the upper cover plate 45, in a manner hereinafter explained, a plurality of passageways that correspond to substantially all of the piping required to interconnect all of the various valve devices of the diesel engine control system shown in FIG. 1, with the exception of additional external piping, as hereinafter described, required to connect certain passageways in the circuit module 44 to the fluid motor 12, the on-off valve devices 16 and 17 and the fluid pressure storage reservoir from which fluid under pressure is supplied to the supply pipe 1, since these elements of the diesel engine control system are not mounted on the circuit module 44 but in a suitable location remote therefrom.

Figure 4:
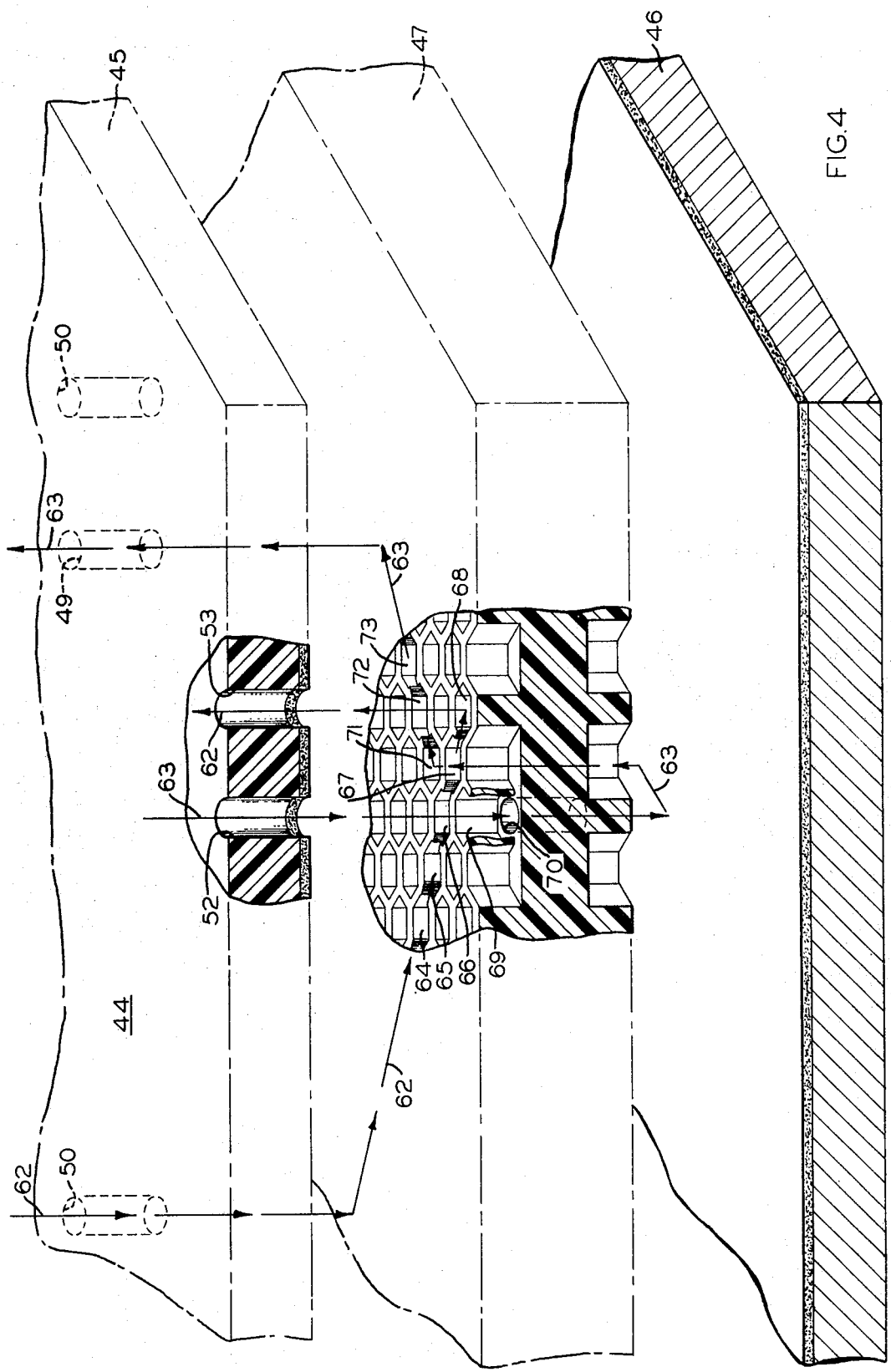

Referring now to FIG. 4 of the drawings, there is shown an exploded view of the circuit module 44 in which the upper cover plate 45 and the lower cover plate 46 are shown disposed respectively above and below the fluid circuit plate 47 in order to illustrate some of the cells or chambers formed in both the upper and lower sides of the circuit plate 47 and how certain of these chambers are interconnected to form fluid pressure conducting passageways in this circuit plate. When assembled, the upper and lower sides of the fluid circuit plate 47, the lower side of the upper cover plate 45 and the upper side of the lower cover plate 46 may be coated with a suitable bonding agent to provide a seal between these plates. However, in place of coating the adjacent sides of the circuit plate and cover plates with a bonding agent, a suitable resilient gasket may be bonded to the adjacent sides of the circuit plate and the cover plates.

The upper cover plate 45, as illustratively shown in FIGS. 2 and 2A, is of sufficient size to accommodate the mounting thereon of twelve valve devices such as, for example, the on-off valve devices 2, 3 and 4 etc. shown in FIG. 1, there being shown thereon in FIGS. 2 and 2A ten such valve devices which are identified by the same reference numerals as in FIG. 1 except that, as hereinbefore stated, the strainer 26, choke 27 and check valve 29 are all incorporated in a single device which is indicated in FIG. 2A by the reference numeral 48.

Figure 3:
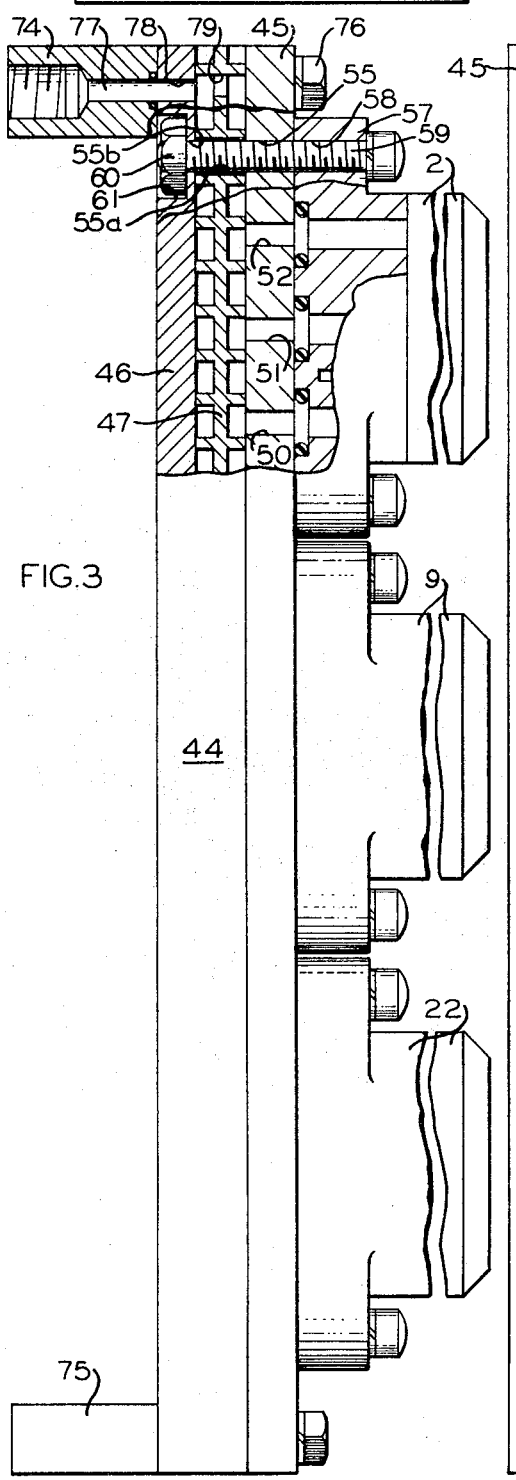

For each of the twelve valve devices that may be removably mounted on the upper cover plate 45, this plate is provided with five bores 49, 50, 51, 52 and 53 which at one end, as shown in FIG. 3, open into a corresponding chamber formed in the circuit plate 47 and at the opposite end open into a coaxial passageway formed in the respective valve device, it being noted that only the bores 50, 51, and 52 appear in FIG. 3. Furthermore, for removably mounting each of the valve devices on the upper cover plate 45, there is provided therein a pair of spaced-apart bores 54 and 55, only the bore 55 appearing in FIG. 3.

Each of the valve devices mounted on the upper cover plate 45 is provided with a pair of mounting lugs 56 and 57, each of which is provided with a bore 58. Each of these valve devices is mounted on the upper cover plate 45 by a pair of bolts 59 and nuts 60, one of these bolts and nuts being shown in FIG. 3. As shown in FIG. 3, the bolt 59 extends through the bore 58 in the lug 57, the bore 55 in the upper cover plate 45, a coaxial bore 55a in the circuit plate 47, which bore connects two corresponding chambers formed in the opposite sides of this circuit plate, and a coaxial bore 55b in the lower cover plate 46 and receives on its threaded end a nut 60 which is received in a corresponding hexagonal recess 61 formed in the left-hand side, as viewed in FIG. 3, of this lower cover plate 46, it being understood that this recess 61 prevents rotation of the nut 60.

As shown in FIG. 4, the fluid circuit plate 47 has formed in both its upper and lower sides a plurality of hexagonal chambers, each chamber being separated from an adjacent chamber by a plastic wall or partition. One or more fluid pressure conducting passageways or troughs of any desired configuration can be formed in either the upper or lower set of chambers in the circuit plate 47 or in both sets of chambers, if desired, by removing, as by cutting, breaking, or otherwise, the plastic wall between each pair of adjacent hexagonal chambers of a selected plurality of pairs of chambers in this plate by any suitable means such as, for example, a pair of pliers, a knife or any other suitable instrument. There is illustratively shown in FIG. 4, two of a plurality of fluid pressure flow conducting passageways which may be formed in the circuit module 44, these two passageways being denoted respectively by a pair of dash lines bearing the reference numerals 62 and 63. As illustratively shown, the first passageway indicated by the reference numeral 62 extends downward through, for example, the bore 50 for one of the 12 valve devices that may be removably mounted on the upper cover plate 45, thence horizontally through a plurality of hexagonal chambers formed in the upper side of the circuit plate 47, five of these chambers being shown in full and indicated by the reference numerals 64, 65, 66, 67 and 68, and then vertically upward through, for example, the bore 53 for a second one of the 12 valve devices, it being understood that the plastic wall between each adjacent pair of these plurality of pairs of chambers in the upper side of the circuit plate 47 has been removed in some suitable mnnner prior to the assembly of this circuit plate 47 between the upper cover plate 45 and the lower cover plate 46 to form the circuit module 44. The above-described passageway indicated by the reference numeral 62 thus provides a fluid pressure flow conducting passageway from one of the twelve valve devices removably mounted on the circuit module 44 to a second one of these valve devices.

The second passageway indicated by the reference numeral 63 extends downward through, for example, the bore 52 for the above-mentioned second one of the twelve valve devices that may be removably mounted on the upper cover plate 45 of the circuit module 44, through a chamber 69 formed in the upper side of the circuit plate 47, a bore 70 in plate 47 that connects this chamber 69 in the upper side of this plate to a corresponding chamber (not shown) formed in the lower side, thence horizontally to an adjacent chamber (not shown), it being understood that the plastic wall between these two adjacent chambers in the lower side of the circuit plate 47 has been removed prior to assembly of the circuit module 44, then vertically upward form this second-mentioned chamber formed in the lower side of the circuit plate 47 through a bore (not shown) in this circuit plate, which bore connects this second-mentioned chamber in the lower side of the plate 47 to a corresponding chamber in the upper side, which chamber is indicated in FIG. 4 by the numeral 71, thence horizontally through a plurality of chambers formed in the upper side of the circuit plate 47, only two of these chambers being shown in full in FIG. 4 and indicated by the reference numerals 72 and 73, and then vertically upward through, for example, the bore 49 for a third one of the 12 valve devices that may be mounted on the circuit module 44. The above-described passageway indicated by the reference numeral 63 thus provides a fluid pressure flow conducting passageway between the above-mentioned second and third valve devices mounted on the circuit module 44.

From the foregoing, it is apparent that a plurality of passageways, each of any desired configuration, can be formed in the circuit plate 47 for (1) interconnecting the various valve devices mounted on the cover plate 45, (2) for supplying fluid under pressure to these valve devices from a suitable source of fluid under pressure which may be connected to one end of the appropriate fluid supply passageway, or for (3) connecting to one end of the appropriate passageway a device that is not mounted on the circuit module 44, it being understood that these connections to the circuit module are made by piping in a manner now to be described.

As shown in FIG. 3 of the drawings, a pair of input-/output manifolds 74 and 75 are secured to the left-hand side of the lower cover plate 46 at the upper and lower ends thereof by a plurality of cap screws 76 which extend through coaxial smooth bores in the upper and lower cover plates 45 and 46, a pair of opposed hexagonal chambers in the circuit plate 47 connected by a bore extending therebetween and have screw-threaded engagement with a corresponding screw-threaded bore in the respective manifold. These cap screws 76 assist the hereinbefore-mentioned bolts 59 and nuts 60 in rigidly clamping the circuit plate 47 between the cover plates 45 and 46. These manifolds 74 and 75 are each provided with a plurality of passageways extending therethrough, one such passageway being shown in FIG. 3 and indicated by the reference numeral 77. Each of these passageways 77 at one end registers with one end of a coaxial passageway 78 in the lower cover plate 46 and at the opposite end is provided with internal screw threads for receiving the screw-threaded one end of a pipe which, for example, may be such as the astern control pipe 8, shown in FIG. 1, it being understood that the opposite end of this pipe is connected to the hereinbefore-mentioned manually-operated control valve device or some other device not mounted on the circuit module 44. The other or right-hand end, as viewed in FIG. 3, of each of these bores 78 in the bottom plate 46 opens into one of the hexagonal chambers in the lower or left-hand side, as viewed in FIG. 3, of the circuit plate 47. This hexagonal chamber may constitute one end of one of the fluid pressure flow conducting passageways formed in the circuit plate 47 or this chamber may be connected to the corresponding chamber on the opposite or right-hand side of the plate 47 by a bore 79 where this chamber constitutes one end of one of the fluid pressure flow conducting passageways in the circuit plate rather than the chamber on the left-hand side. It should be understood, however, that one or more of these bores 79 are drilled to connect two opposite chambers in the circuit plate 47 when necessary and are not moulded in this plate when originally manufactured.

In the plan view of the circuit module 44, shown in FIGS. 2 and 2A, when taken together such that the right-hand edge of FIG. 2 is matched with the left-hand edge of FIG. 2A, portions of the valve devices 25 and 33 and a portion of the upper cover plate 45 have been removed to show a plurality of the hexagonal chambers formed in the circuit plate 47. As shown, 19 walls between pairs of adjacent chambers are shown removed to form portions of four of the fluid pressure flow conducting passageways provided in the fluid circuit plate 47 of the circuit module 44, one of the openings thus formed and connecting two such adjacent chambers being indicated by the reference numeral 80. The openings between the remaining adjacent pairs of chambers, formed by the removal of the respective wall therebetween, are shown dotted in FIGS. 2 and 2A. Accordingly, the plurality of passageways thus formed in the fluid circuit plate 47 of the circuit module 44 in order to interconnect the plurality of valve devices removably mounted on the upper cover plate 47 in the same manner as shown in FIG. 1 of the drawings is apparent from FIGS. 2 and 2A when taken together.

Where it is desired to provide a direct exhaust to atmosphere from any one of the valve devices mounted on the upper cover plate 45, a bore can be drilled through the lower cover plate 46 and the wall separating a pair of corresponding chambers in the opposite sides of circuit plate 47 at such a location that one end thereof opens into that one of the chambers in the circuit plate 47 that is in registry with one end of that one of the bores 49, 50, 51, 52 or 53 for the respective valve device that at its opposite end registers with the exterior end of the exhaust passageway in the valve device.

Figure 5:
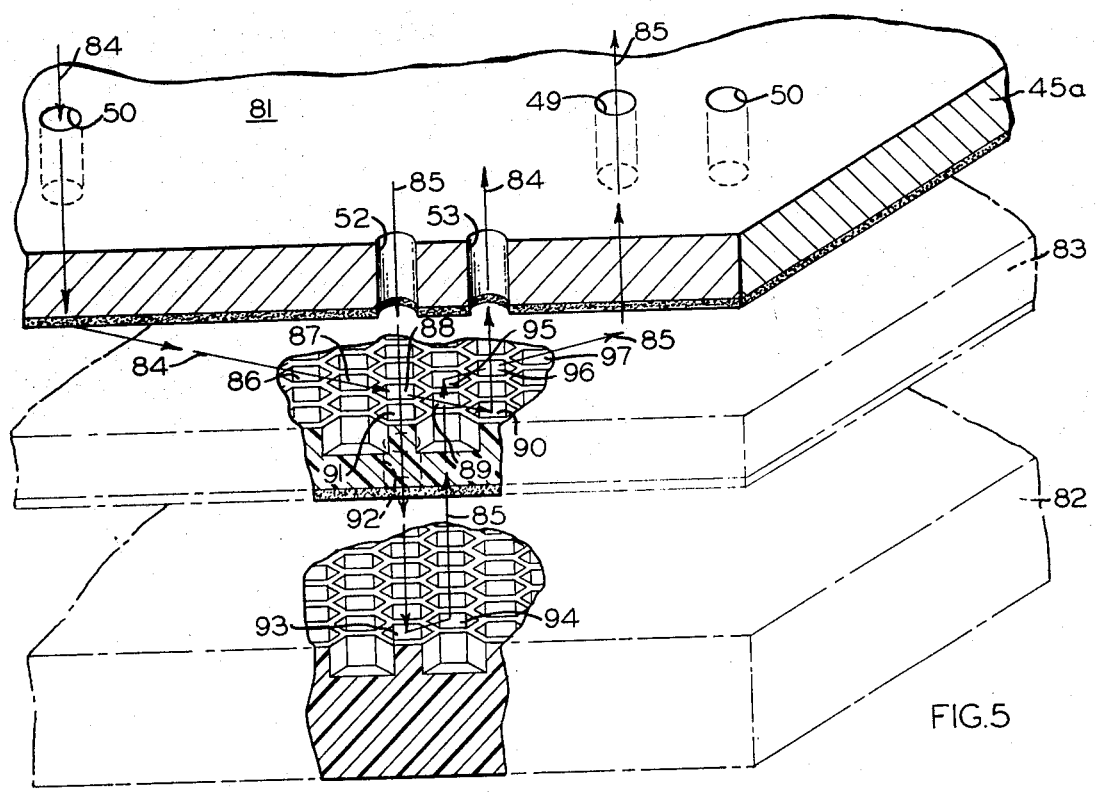
FIG. 5 is an exploded view of part of a circuit module constituting a second embodiment of the invention in which cells or chambers are formed in the upper side of both the circuit plate and the lower cover plate.

FIG. 5 shows an exploded view of a circuit module 81 that constitutes a second embodiment of the invention. The upper cover plate 45a of the circuit module 81 may be identical to the upper cover plate 45 of the circuit module 44 except it is constructed of metal instead of plastic. Accordingly, like reference numerals have been used to designate the structure of this upper cover plate shown in FIG. 5 which is identical with that shown in FIG. 4. Only such features of the structure and operation of the embodiment of FIG. 5 which differ from that of the embodiment of FIG. 4 will be hereinafter described.

According to the second embodiment of the invention shown in FIG. 5, this circuit module 81 comprises the metallic upper cover plate 45a upon which is removably mounted a plurality of the valve devices shown in FIG. 1, a moulded cellular plastic lower cover plate 82 in the upper side of which is formed a plurality of cells or chambers, and a moulded cellular plastic fluid circuit plate 83 disposed between these two cover plates and having formed in its upper side a plurality of cells or chambers. As in the first embodiment of the invention, there may be formed in the circuit module 81 a plurality of passageways that correspond to all of the piping required to interconnect those ones of the various valve devices of the diesel engine control system shown in FIG. 1 that are removably mounted on the upper cover plate 45a, it being understood that external piping is required to connect certain passageways in the circuit module 81 to the fluid motor 12, valve devices 16 and 17 and the fluid pressure storage reservoir, as in the first embodiment of the invention.

As shown in FIG. 5, one or more fluid pressure conducting passageways of any desired configuration can be formed in either the fluid circuit plate 83 or the lower cover plate 82, or in both the fluid circuit plate 83 and the lower cover plate 82 by removing, as by cutting, breaking, or otherwise removing the plastic wall between each pair of adjacent hexagonal chambers of a plurality of pairs of chambers in either the fluid circuit plate 83 or the lower cover plate 82, or in both, by means of some suitable instrument. There is illustratively shown in FIG. 5, two of a plurality of fluid pressure flow conducting passageways which may be formed in the circuit module 81, these two passageways being denoted respectively by a pair of dash lines bearing the reference numerals 84 and 85. As illustratively shown in FIG. 5, the first passageway indicated by the reference numeral 84 extends downward through, for example, the bore 50 for one of the twelve valve devices that may be removably mounted on the upper cover plate 45a, thence horizontally through a plurality of hexagonal chambers formed in the upper side of the fluid circuit plate 83; five of these chambers being shown in full in FIG. 5 and indicated by the reference numerals 86, 87, 88, 89 and 90, and then vertically upward through, for example, the bore 53 for a second one of the valve devices mounted on the upper cover plate 45a. It will be understood, of course, that the plastic wall between each adjacent pair of these plurality of pairs of chambers in the upper side of the fluid circuit plate 83 is removed in some suitable manner prior to assembly of this circuit plate 83 between the upper cover plate 45a and the lower cover plate 82 to form the circuit module 81 even though for simplicity in making the drawings, this removal has been omitted in FIG. 5. The above-described passageway indicated by the reference numeral 84 thus provides a fluid pressure flow conducting passageway from one of the valve devices mounted on the circuit module 81 to a second one of these devices.

The second passageway indicated by the reference numeral 85 extends downward through, for example, the bore 52 for the above-mentioned second valve device mounted on the upper cover plate 45a of circuit module 81, through a chamber 91 formed in the upper side of the fluid circuit plate 83 and a bore 92 extending from the bottom of chamber 91 through the circuit plate 83 to the lower side thereof to a corresponding chamber in the lower cover plate 82 and denoted by the reference numeral 93, thence horizontally to an adjacent chamber 94, it being understood that the plastic wall between chambers 93 and 94 has been removed prior to assembly of the circuit module 81, then vertically upward from the chamber 94 through a bore (not shown) that at its lower end opens at the lower side of the circuit plate 83 and at its upper end into a chamber 95 in the upper side of this circuit plate, thence horizontally through a plurality of chambers formed in the upper side of the circuit plate 83, only two of these chambers being shown in full in FIG. 5 and indicated by the reference numerals 96 and 97, and then vertically upward through, for example, the bore 49 for a third one of the valve devices that may be mounted on the circuit module 81. The above-described passageway indicated by the reference numeral 85 thus provides a second fluid pressure flow conducting passageway between the above-mentioned second and third valve devices mounted on the circuit module 81.

Except as pointed out above, the construction of the circuit module 81 is substantially the same as that of the circuit module 44. Hence, a further detailed description of the circuit module 81 is believed to be unnecessary.

Figure 6:
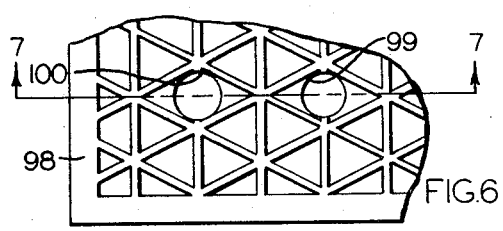
FIG. 6 is a partial plan view of a circuit plate for use in a circuit module constituting a third embodiment of the invention.
Figure 7:
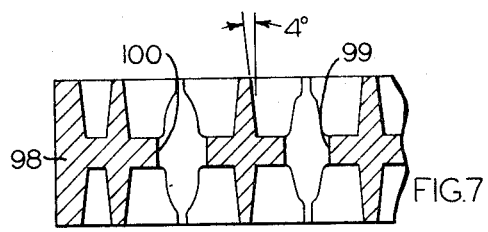
FIG. 7 is a partial vertical cross-sectional view, taken along the line 7—7 of FIG. 6 and looking in the direction of the arrows, showing further structural details of the circuit plate shown in FIG. 6.

FIGS. 6 and 7 show a part of a triangular cellular plastic fluid circuit plate 98 that may be used to contruct a circuit module comprising a third embodiment of the invention. As shown in FIGS. 6 and 7, the fluid circuit plate 98 has formed in both its upper and lower sides a plurality of triangular chambers, each chamber being separated from an adjacent chamber by a plastic wall, the sides of which are tapered at an angle of, for example, 4°. One or more fluid pressure conducting passageways of any desired configuration can be formed in either the upper or lower set of chambers in the circuit plate 98 or in both sets of chambers, if desired, by removing in some suitable manner the tapered plastic wall between each pair of adjacent triangular chambers of a plurality of pairs of chambers in this plate.

Prior to assembly of the circuit module comprising fluid circuit plate 98, one or more bores, such as the bore 99, may be drilled therein to connect one or more fluid pressure flow conducting passageways formed in one side of the circuit plate 98 to one or more fluid pressure flow conducting passageways formed in the other side of this circuit plate.

Figure 8:
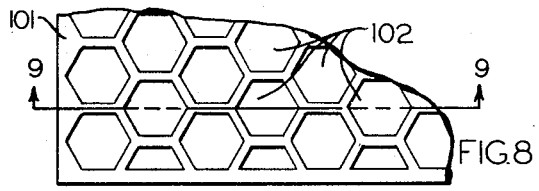
FIG. 8 is a partial plan view of a circuit plate for use in a circuit module constituting a fourth embodiment of the invention.

Furthermore, a plurality of bores 100, only one of which is shown in FIGS. 7 and 8, are drilled in the fluid circuit plate 98, through which bores pass cap screws, such as the cap screws 76 shown in FIGS. 2, 2A and 3, which clamp the fluid circuit plate 98 between an upper and a lower cover plate such as, for example, the upper cover plate 45 and the lower cover plate 46 shown in FIGS. 3 and 4 to form a circuit module that constitutes the third embodiment of the invention.

Figure 9:
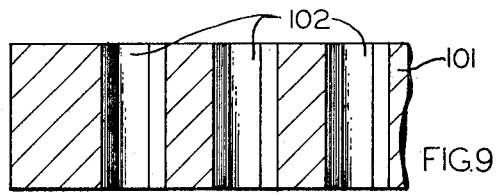
FIG. 9 is a partial vertical cross-sectional view, taken along the line 9—9 of FIG. 8 and looking in the direction of the arrows, showing further structural details of the circuit plate shown in FIG. 8.

FIGS. 8 and 9 show a part of a hexagonal cellular plastic fluid circuit plate 101 that may be used to construct a circuit module comprising a fourth embodiment of the invention. As shown in FIGS. 8 and 9, the fluid circuit plate 101 is provided with a plurality of hexagonal chambers or openings 102 that extend therethrough from the upper side to the lower side rather than with one set of chambers formed in each side as in the fluid circuit plate 47, or with one set of chambers formed in only one side as in the fluid circuit plate 83. It should be understood that, except as noted above, the circuit module constituting the fourth embodiment of the invention is identical to the circuit module 44 that constitutes the first embodiment of the invention.

In each embodiment of the invention, a suitable bonding agent is applied to either the lower side of the upper cover plate and the upper side of the lower cover plate or to both sides of the fluid circuit plate prior to assembly of the respective circuit module. Subsequent to assembly, this bonding agent hardens to provide a seal between each respective cover plate and the fluid circuit plate to prevent leakage of fluid under pressure therebetween.

Having now described the invention, what we claim as new and desire to secure by Letters Patent, is:

1. A circuit module for fluid distribution comprising:
   a. a pair of spaced-apart parallel cover plates each having a plurality of passageways extending therethrough from one side to the other, certain of said passageways in one of said plates being so arranged as to mate with the ports of a valve device removably mounted on said one plate,
   b. a fluid circuit plate interposed between said pair of cover plates, said fluid circuit plate having a plurality of thin-walled partitions defining a plurality of hollow triangular chambers that extend therethrough from one side thereof to the other side, said partitions being selectively removable to form passageways extending through said chambers, the partitions so selected being such that the chamber constituting either end of each of said passageways is in registry with one end of one of said passageways in one of said pair of cover plates, and
   c. means for securing said fluid circuit plate to said cover plates in sealing relationship therewith.

2. A circuit module for fluid distribution comprising:
   a. a pair of spaced-apart parallel cover plates each having a plurality of passageways extending therethrough from one side to the other, certain of said passageways in one of said plates being so arranged as to mate with the ports of a valve device removably mounted on said one plate,
   b. a fluid circuit plate interposed between said pair of cover plates, said fluid circuit plate having disposed on one face thereof a plurality of thin-walled partitions defining a plurality of hollow triangular chambers, said partitions being selectively removable to form passageways extending through said chambers, the partitions so selected being such that the chamber constituting either end of each of said passageways is in registry with one end of one of said passageways in one of said pair of cover plates, and
   c. means for securing said fluid circuit plate to said cover plates in sealing relationship therewith.

3. A circuit module for fluid distribution comprising:
   a. a first cover plate having a plurality of passageways extending therethrough from one side to the other, certain of said passageways being so arranged as to mate with the ports of a valve device removably mounted on said first cover plate,
   b. a fluid circuit plate having moulded in one side thereof a plurality of chambers, each separated from a plurality of adjacent chambers by a partition, said partitions being selectively removable to form passageways through said chambers, and
   c. a second cover plate having moulded in a side thereof that is disposed adjacent the other side of said fluid circuit plate a plurality of chambers, each separated from a plurality of adjacent chambers by a partition, said partitions being selectively removable to form passageways through said chambers, each passageway in said second cover plate being selectively connectable to any one of said passageways in said circuit plate that passes through a chamber in said circuit plate that is coaxial with a chamber in said second cover plate through which the respective passageway in said second cover plate passes, by removing the partition in said circuit plate that separates said coaxial chambers, and
   d. means for securing said fluid circuit plate to said first and second cover plates in sealing relationship therebetween.

4. The method of forming a module for fluid distribution from a pair of cover plates, one of which is metallic and is provided with a plurality of bores, certain of which at one end mate with ports in one of a plurality of valve devices removably mounted thereon and the other of which plates is moulded plastic and is provided on one side thereof with a plurality of chambers, each separated from a plurality of adjacent chambers by a partition, and a moulded plastic fluid circuit plate provided on one side thereof with a plurality of chambers, each separated from each one of a plurality of adjacent chambers by a partition, comprising the steps of:
   a. selecting a plurality of pairs of adjacent chambers in either said other cover plate or in said circuit plate or in both said other cover plate and said circuit plate to form a plurality of desired configurations in the plurality of chambers in either said other cover plate or in said circuit plate or in both,
b. removing the partitions between each pair of adjacent chambers of said selected pairs of chambers for each of said desired configurations and the partition between certain chambers in said circuit plate and the corresponding coaxial chambers in said other cover plate whereby, subsequent to said removal of said partitions, said plurality of pairs of adjacent chambers for each configuration forms a trough of the respective desired configuration,
c. providing holes in said other cover plate for communicating certain selected chambers therein with atmosphere whereby the respective trough passing through a selected chamber may exhaust fluid under pressure therethrough,
d. coating the side of each of said cover plates adjacent said circuit plate with a bonding sealant,
e. placing the coated side of each of said cover plates in contact with the adjacent side of said fluid circuit plate,
f. passing bolts of proper length successively through certain other of said bores in said one cover plate, certain of said chambers in said circuit plate, and the corresponding coaxial chambers and holes in said other cover plate, and
g. securing nuts to the ends of said bolts thereby to clamp said circuit plate between said cover plates.

* * * * *